Figure 3:
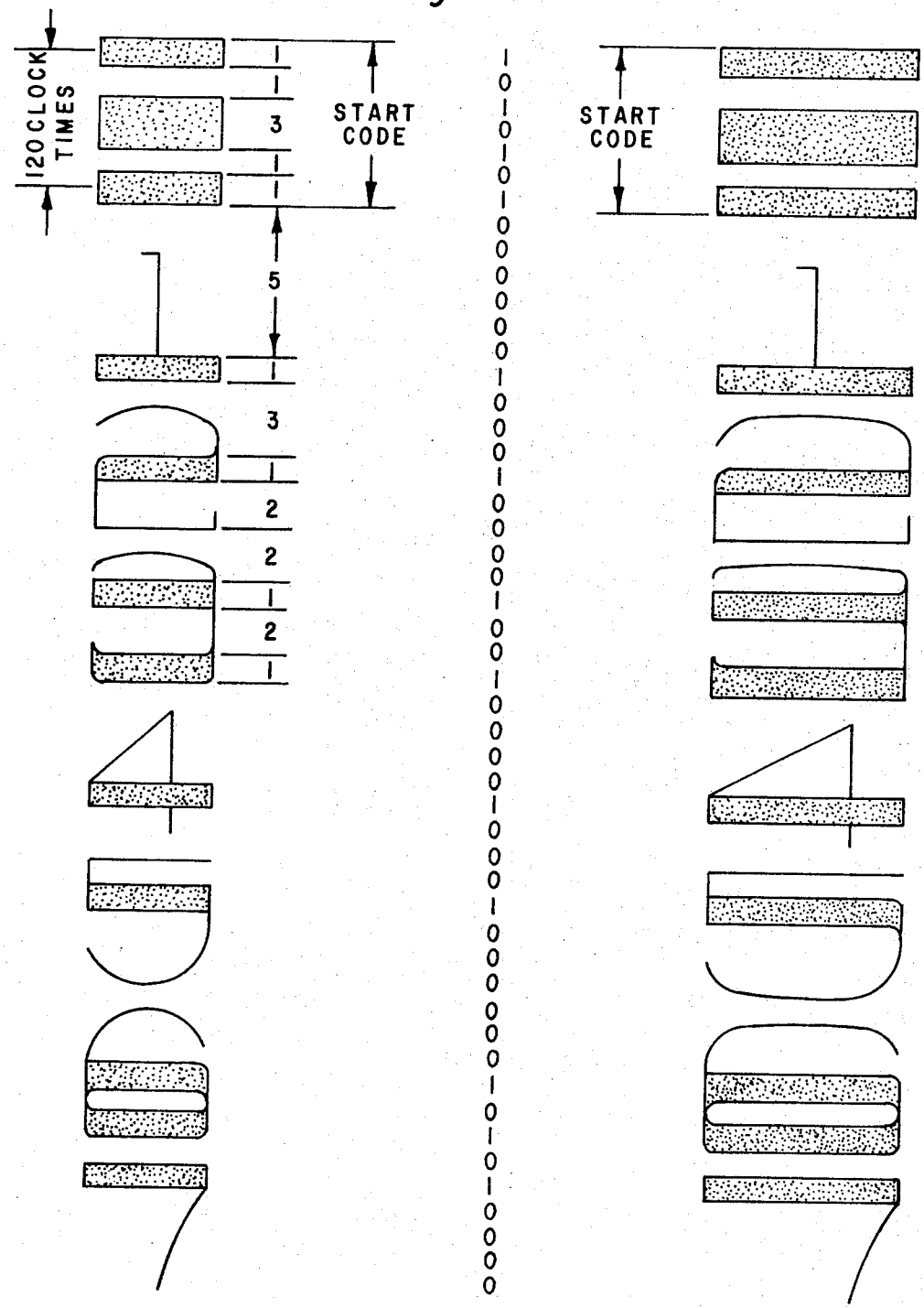

United States Patent [19]
Meyer

[11] 3,761,725
[45] Sept. 25, 1973

[54] AUTOMATIC TIRE IDENTIFIER WITH THRESHOLD SETTING PROPORTIONAL TO THE RECEIVED SIGNALS

[75] Inventor: Lawrence L. Meyer, Houston, Tex.

[73] Assignee: Texas Instruments Incorporated, Dallas, Tex.

[22] Filed: Dec. 30, 1971

[21] Appl. No.: 214,219

[52] U.S. Cl.......................250/566; 235/61.11 E
[51] Int. Cl. ............................................. G01n 21/30
[58] Field of Search................ 250/219 D, 219 DD, 250/219 DC, 214, 223; 235/61.11 E; 178/6.8

[56] References Cited
UNITED STATES PATENTS

| | | | |
|---|---|---|---|
| 3,461,303 | 8/1969 | Hanson | 250/219 DC |
| 3,560,751 | 2/1971 | Buettner | 250/219 DC |
| 3,576,452 | 4/1971 | Smith | 250/219 DC |
| 3,663,800 | 5/1972 | Myer | 250/219 D |
| 3,643,068 | 2/1972 | Mohan | 250/219 D |
| 3,328,590 | 6/1967 | Kapsambelis | 250/219 D |

Primary Examiner—James W. Lawrence
Assistant Examiner—D. C. Nelms
Attorney—Harold Levine et al.

[57] ABSTRACT

An automatic tire identification system starts with a tire having a black code printed on the tire tread. The tread and code are illuminated and the reflected energy is read and detected. The reflected energy from the tire tread and code is differentiated to produce a signal representative of the code read from the tire. The code is then decoded to determine the code printed on the tire tread.

5 Claims, 4 Drawing Figures

Fig. 1

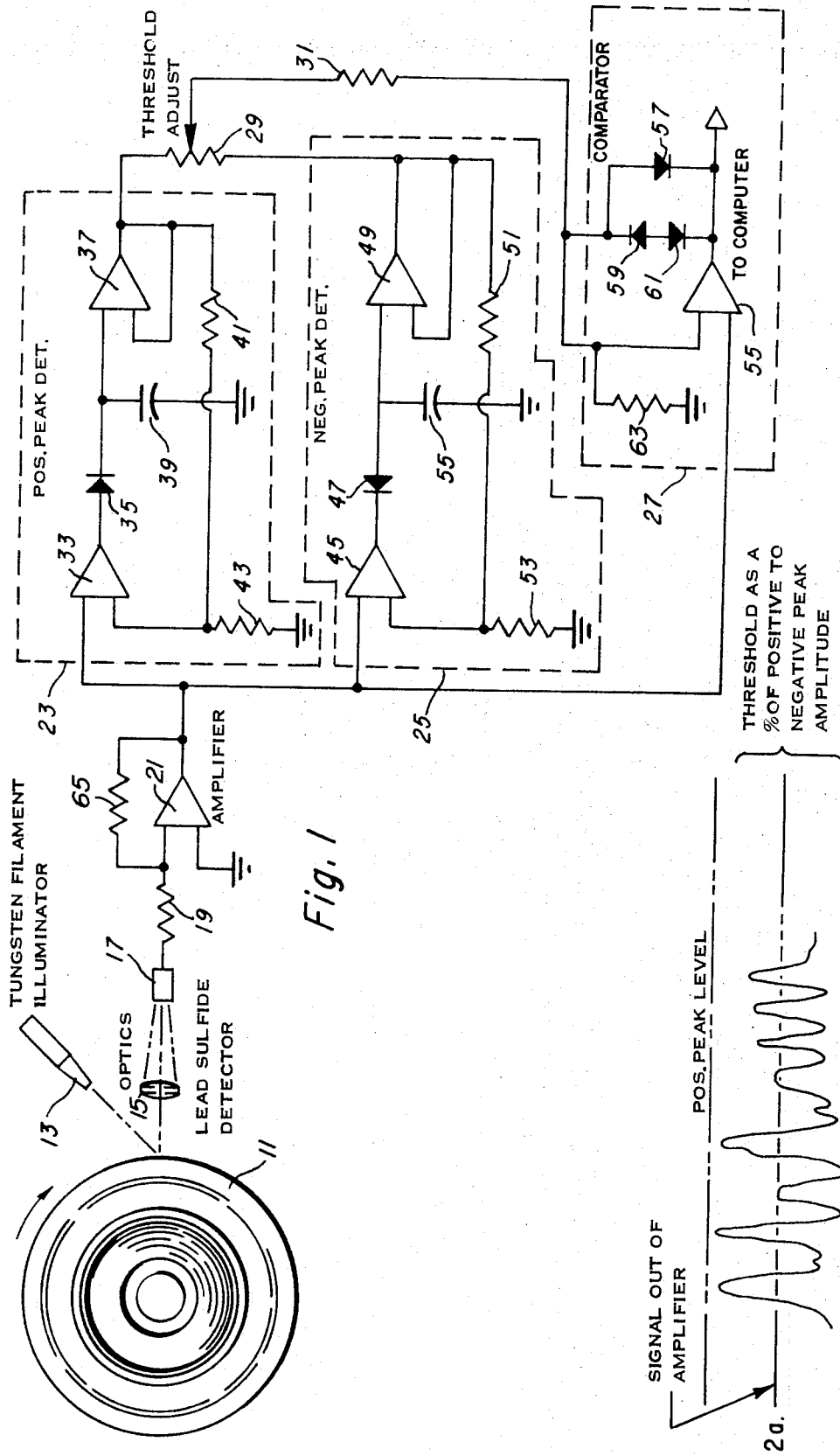

AUTOMATIC TIRE IDENTIFIER WITH THRESHOLD SETTING PROPORTIONAL TO THE RECEIVED SIGNALS

This invention is directed to a tire code reader for reading a code from a tire.

One of the major problems in the manufacture of automotive tires and other tires has been the identification of the tires during the manufacturing operation. During the manufacture of a tire the tire proceeds through many operations such as molding, curing, and the like. For the purpose of automatically sorting tires between these operations it is desirable to have a tire identification system which can automatically read the number assigned to the tire so that the tire may be automatically sorted according to the operation to be performed, and the tire may be kept track of during the sorting and manufacturing operations. It is also desirable to have the tire coded such that it can both be automatically read and visually read.

There have been previous schemes proposed for automatically reading the tire on a code such as putting magnetic devices in a special bead of the tire so that the code magnetically encoded in the tire may be read.

The previous tire identification schemes have had disadvantages such as the requirement of an addition of a foreign substance to the rubber of the tire, high energy requirements for encoding the code on the tire, poor resolution of recorded data, added components required in the construction of the tire which increased the labor cost, and new tire construction techniques which would degrade the signal recovery from the tire.

It is therefore an object of this invention to provide a new and improved tire identification system.

Another object of this invention is to provide a new and improved automatic tire identification system.

In the drawings

FIG. 1 shows a block diagram of the tire reader;
FIG. 2a shows a sample wave form in the tire reader;
FIG. 2b shows the signal applied to the decoder;
FIG. 3 shows a code printed on the tire.

Referring now to FIG. 1 a tire 11 is rotated by a mechanical mechanism. The mechanical mechanism itself is not shown. The rotation is in the direction shown by the arrow. A numerical code, such as the code shown in FIG. 3, is printed on the tread surface of the tire. The code is printed in a standard tire printing paint which is orange at the time it is printed on the tire and turns black with heat during the curing operations. The printing paint is made by the Lewis Roberts Company and is assigned catalog number XXK813. The tread surface, and the printed code on the tread of the tire, is illuminated by tungsten filament illuminator 13. Energy generated by the tungsten filament illuminator 13 is in the infrared region. The energy passes from the tungsten filament illuminator 13 to the tread surface of the tire 11, is reflected from the tread surface of the tire and picked up by the optics 15. The optics 15 includes a lens which focuses the reflected energy on a lead sulfide detector 17. The optics 15 also includes an aperture which gives a vertical type of pattern and a filter which cuts off all background radiation below the region of approximately 2 microns. The output from the lead sulfide detector 17 passes through a resistor 19 and is amplified by operational amplifier 21. The output from amplifier 21 is applied to a positive peak detector 23 and a negative peak detector 25. The outputs from the positive peak detector 23 and the negative peak detector 25 are applied to a comparator 27 through a variable threshold adjustment 29 and resistor 31. The variable threshold adjustment 29 may be adjusted for threshold adjustment. The output from comparator 27 is applied to either a stored program computer which is programmed to decode the code on the tire 11 shown in FIG. 3 or to a prewired computer which is wired to decode the code shown in FIG. 3.

The positive peak detector 23 has its input applied to operational amplifier 33 and is connected through a diode 35 to another operational amplifier 37. The line between the diode 35 and amplifier 37 is connected through a capacitor 39 to ground. The output of amplifier 37 is the output of the positive peak detector 23 and is connected also back to another input of amplifier 37 and connected through a resistor 41 to the input of amplifier 33 and to ground through resistor 43.

The negative peak detector 25 has its input connected to operational amplifier 45 through a diode 47 to another operational amplifier 49. The output from amplifier 49 is the output from the negative peak detector 25 and is connected back to another input of amplifier 49 and connected through a resistor 51 to another input of amplifier 45 and connected through a resistor 53 to ground. The line between diode 47 and amplifier 49 is connected through a capacitor 55 to ground.

The comparator 27 has its input from the threshold adjuster 29 to one input of operational amplifier 55. The other input to comparator 27 from amplifier 21 is connected to another input of amplifier 55. The input from the threshold adjuster 29 is connected through a diode 57 to the output of amplifier 55 and through a diode 59 and a zener diode 61 to the output of amplifier 55.

FIG. 3 shows a code printed on the tire itself. The representative code of FIG. 3 consists of a start code and a series of bars representing the numbers one through seven. The bars shown represent the code which is read by the tire reader. The lines are also printed so that the numbers on the tire can be read visually, however the lighter lines do not represent the code as read by the tire reader. Due to various tire sizes, rotational speeds of the tire, stretch of the rubber in the curing process, and other factors which effect the code size, it is necessary to first determine the bit size of the code by making a measurement of the width of the bars as a part of reading the start code. This is done for each code read from a tire. The start code shown consists of seven bit positions, with a first bar one bit position in width, a space one bit position in width, a bar three bit positions wide, a space one bit position wide and a bar one bit position wide.

In the particular numerical representation of the code shown in FIG. 3, the numerals following the start code are the numerals 1, 2, 3, 4, 5, 6, and 7. As noted previously, these codes are printed on the tire so that they can be read both visually and by the tire reader. In the reading of the code from the tire, a solid bar in a bit position will indicate a binary 1 while a space one bit wide will represent a binary 0. Following the start code there are five spaces from the end of the start code, until the bar ending the numeral 1 is read which is one bit wide. There is then one space three bits wide from the end of the reading of the numeral 1 until the first bar in the numeral 2 is read which is one bit wide. There is then in the numeral 2, one space two bits wide, to complete the reading of the numeral 2. There is one space two bits wide following the reading of the numeral 2 until the first bar in the numeral 3 is read. The first bar in the numeral 3 is one bit wide. There is then one space for a total of two bits wide in the numeral 3 with a bar one bit wide completing the reading of the numeral 3. The numerals 4, 5, 6, and 7 are read with a combination of spaces and bars as shown. FIG. 3 also shows a binary 1 or a binary 0 corresponding to whether a bar or a space is read.

OPERATION

A particular code including the start code is printed on the tire 11. The tread surface of the tire 11 is illuminated by the tungsten filament illuminator 13 so that the energy passes from the tungsten filament illuminator 13 to the tread surface of the tire and then reflected back to the optic system 15. Energy is reflected more by the coded bars than by the bare rubber so that the reflected energy from the code bars is picked up by the optic system 15 which focuses the reflected energy on the lead sulfide detector 17. The aperture in the optics 15 gives a vertical bar type of pattern and the filter in the optics cuts off all background radiation below the region of approximately 2 microns. The spectral responsivity is between 2 and approximately 3.7 microns. The tread surface of the tire reflects some energy in addition to that reflected by the bar codes and the output of the lead sulfide detector 17 is amplified by amplifier 21 producing the output signal for a representative bar code shown in FIG. 2a. The positive peak detector 23 then finds the positive peak signals which are those resulting from the reflected energy from the code bars and the negative peak detector 25 finds the negative most signals which are those represented by the lowest level of background energy by setting a threshold by threshold adjustment 29 which is proportional to the difference between these two peaks, the positive peak and the negative peak, and then applying that threshold to comparator 27 where the comparator 27 picks out only those peaks which exceed the threshold level. The sample wave form shown in FIG. 2a shows several large peaks and some minor peaks. Several of the minor peaks would be background level signals from the tread surface of the tire and the peaks exceeding the threshold level are peaks representing signals reflected from the code marks. Comparator 27 then produces the signal shown in FIG. 2b in a binary form with the positive logic level representing the signals from the code bars and the zero logic level representing spaces for no reflections from a code bar.

The signal from the comparator 27 is supplied to the computer with a representative code being that shown in FIG. 3. The data is clocked into the computer system with the computer system looking for the start code. When the start code is found, and the number of clock times between the center of the first heavy bar in the start code to the center of the last heavy bar in the start code are measured. The measurement is carried out in the following manner. There are six bit positions from center to center of the first and last code bars in the start code. The clock times between the centers of these two bars are divided by 6 to indicate the bit size in terms of clock pulses. This measurement is then used to determine the binary 1's and binary 0's in the coded numerals following the start code. For example, assuming that the measurement between the middle of the first bar and the last bar in the start code is 120 clock pulses, then 120 divided by 6 indicates that each bit width is 20 clock pulses wide. Then as shown in FIG. 3, the clock count between the end of the start and the beginning of the bar in the numeral 1 would be five bit positions equal to 100 clock pulses. The computer operation then develops a code of 0's and binary 1's as shown and then decodes this information as shown in FIG. 3 to come up with the actual coded numeral printed on the tire.

What is claimed is:
1. A tire reader for reading a code from a tire comprising:
   a. means for illuminating the tire and code thereon;
   b. optic means for reading the reflected energy from said code and tire;
   c. means for detecting the energy read by said optic means;
   d. means for amplifying the signal detected by said detecting means;
   e. means for detecting the positive signal peaks representing said code;
   f. means for detecting the negative signal peaks representing said tire;
   g. means for setting a threshold level proportional to the difference between said positive and negative peaks; and
   h. comparator means to pick out those peaks above said threshold level, wherein those peaks above said threshold level indicate the code on said tire.

2. The tire reader claimed in claim 1 wherein said illuminating means is a tungsten filament illuminator.

3. The tire reader claimed in claim 1 including a lead sulfide photodetector for detecting the energy read by said optic means.

4. The method of identifying tires including the steps of
   a. printing a code on the tread of said tire;
   b. illuminating said tread and code;
   c. reading the reflected energy from said code and tread;
   d. detecting said reflected energy with a lead sulfide photodetector;
   e. amplifying said detected signal;
   f. detecting the positive signal peaks representing said code;
   g. detecting the negative signal peaks representing said tread;
   h. setting a threshold level proportional to the difference between said positive and negative peaks; and
   i. comparing said signal with said threshold level to pick out those peaks above said threshold level, wherein those peaks above said threshold level indicate the code on said tire.

5. The method claimed in claim 4 including the step of decoding said code.

* * * * *